Figure 1:
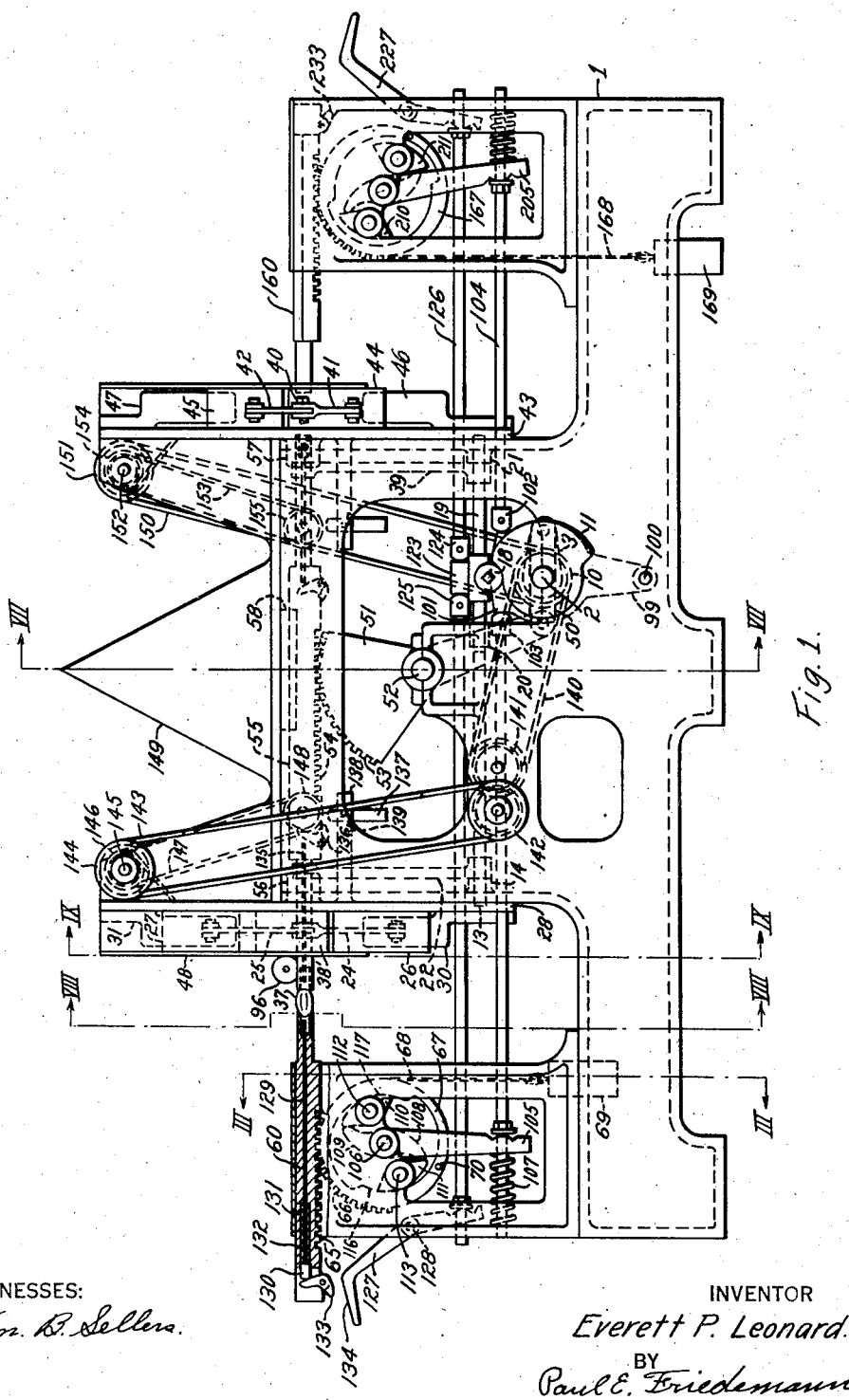

Nov. 23, 1948.　　　　E. P. LEONARD　　　　2,454,660
NUT-SHELLING MACHINE

Filed May 11, 1945　　　　　　　　　　　　6 Sheets-Sheet 1

WITNESSES:
Wm. B. Sellers.

INVENTOR
Everett P. Leonard.
BY
Paul E. Friedemann
ATTORNEY

Nov. 23, 1948.  E. P. LEONARD  2,454,660
NUT-SHELLING MACHINE
Filed May 11, 1945  6 Sheets-Sheet 2
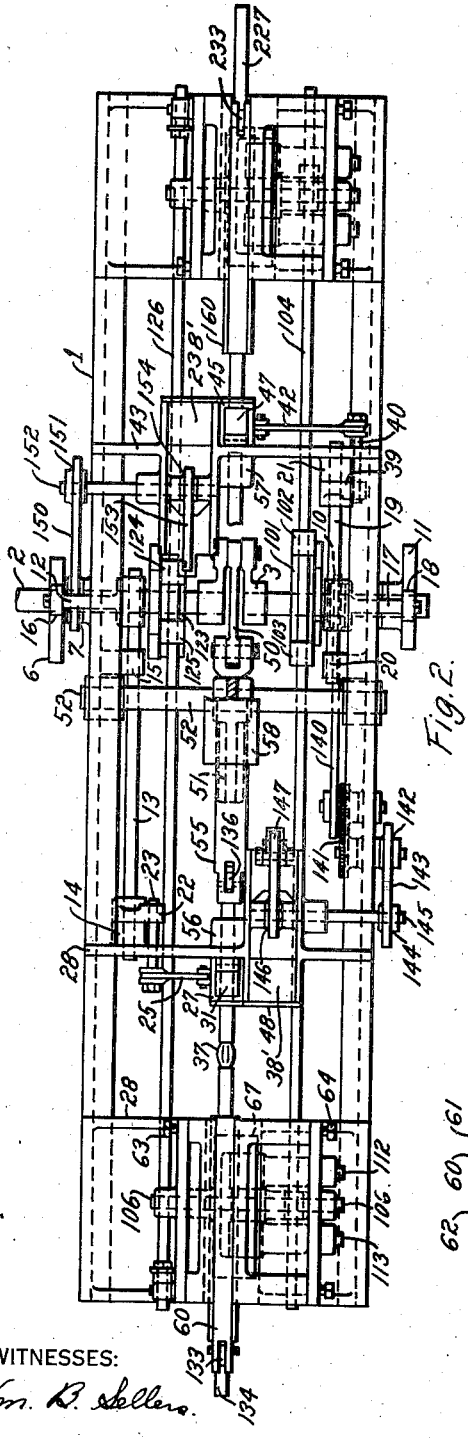
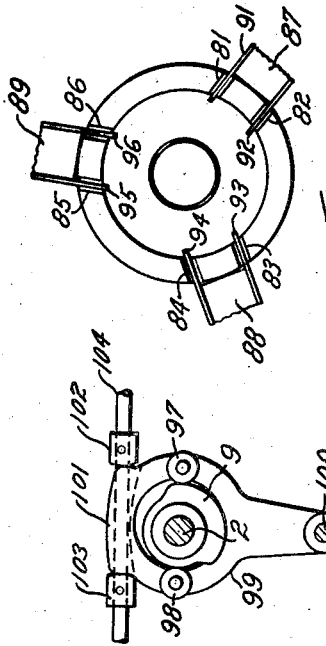
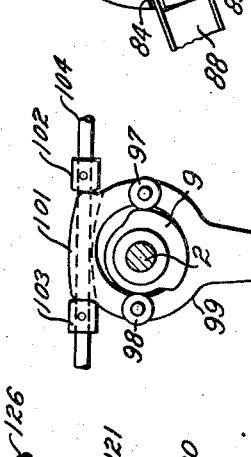
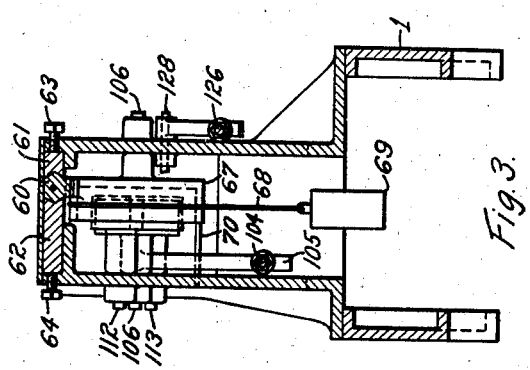
INVENTOR
Everett P. Leonard.
BY
Paul E. Friedmann
ATTORNEY Nov. 23, 1948.   E. P. LEONARD   2,454,660
NUT-SHELLING MACHINE Filed May 11, 1945   6 Sheets-Sheet 3

WITNESSES:
Wm. B. Sellers.

INVENTOR
Everett P. Leonard.
BY
Paul E. Friedemann
ATTORNEY

Nov. 23, 1948.  E. P. LEONARD  2,454,660
NUT-SHELLING MACHINE
Filed May 11, 1945  6 Sheets-Sheet 4

WITNESSES:
Wm. B. Sellers

INVENTOR
Everett P. Leonard.
BY
Paul E. Friedmann
ATTORNEY

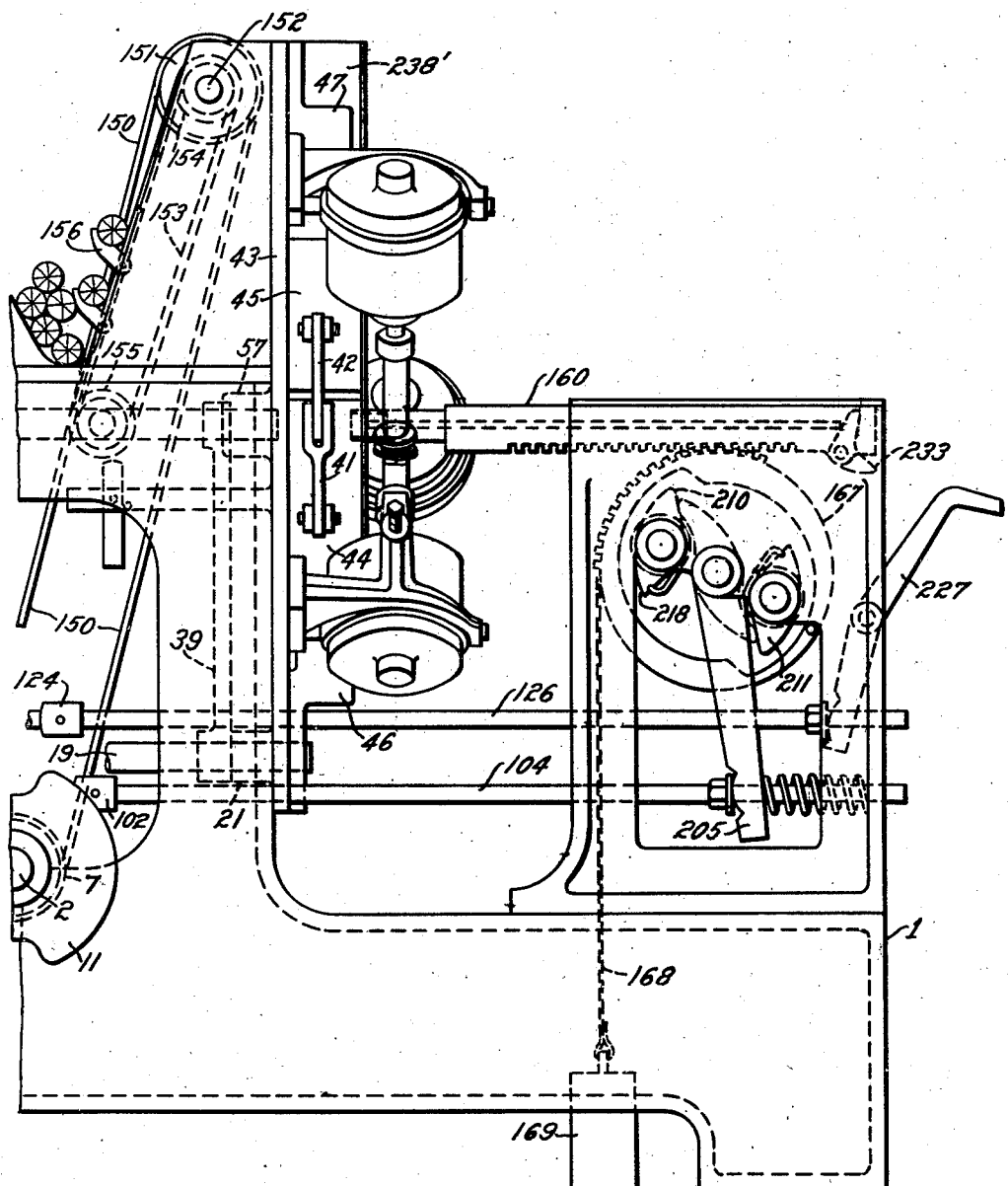

Patented Nov. 23, 1948

2,454,660

UNITED STATES PATENT OFFICE 2,454,660

NUT-SHELLING MACHINE

Everett P. Leonard, Fort Worth, Tex.

Application May 11, 1945, Serial No. 593,265

11 Claims. (Cl. 146—12)

My invention relates to machines for the removal of the shells from nuts and more particularly to machines for the removal of the shell of nuts by sawing, scoring, or cutting the nutshells so that the meat or kernels may be taken out intact.

One broad object of my invention is the provision of means for removing the nut kernel from the shell of the nut so that the meat, or kernel, is not materially damaged or crushed.

Another broad object of my invention is the provision of means for rapidly and automatically cutting the shell from a nut so that the kernel remains substantially intact and so that the kernel may be readily separated from the cut elements of the shell.

A more specific object is the provision of means for cutting the shell of a pecan longitudinally thereof into a plurality of segments with the cuts beginning near one apex of the pecan and ending near the other apex of the pecan and the provision of means for subjecting the pecan to an axial force after the cutting is completed so that all the segments break into a plurality of pieces at one or more regions circumferentially of the pecan.

Another object is the provision of a double acting nut-shelling machine wherein no elements of the machine go through an idle cycle of operation.

Other objects of my invention are: the provision of recessed means for gripping the ends of an elongated nut having apexes at its end; the provision of means for cutting only the shell and not the kernel of the nut into longitudinal strips intermediate the apexes; the provision of means for subjecting the nut, an instant after the shell cutting operation is completed regardless of the length of the nut, to an axial force to crack the shell from the kernel; and the provision of means for ejecting the apexes from the recesses of the recessed means.

Figure 7:
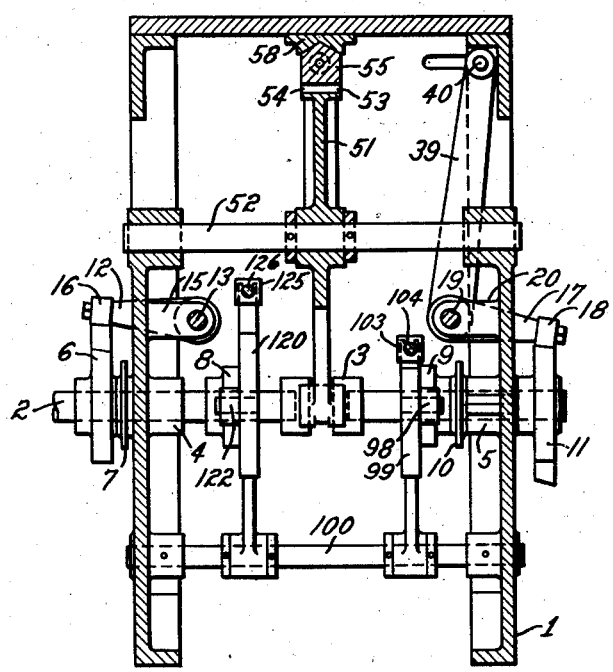

The objects of my invention just recited are merely illustrative of many other objects and advantages, which other objects and advantages will become more apparent from a study of the following specification and from the accompanying drawings, in which:

Figure 1 is a side view of my double acting nutshell cutting machine but with some elements removed and the supply hopper shown schematically to facilitate the understanding of this figure and the description relating thereto;

Fig. 2 is a plan view of my machine showing some parts broken away and others removed to similarly facilitate the description of my machine, Fig. 3 is a sectional view on section line III—III of Fig. 1 looking in the direction indicated by the arrows at the ends of the section line, Figs. 4, 5 and 6 are enlarged views of certain details of my invention, Fig. 7 is a sectional view on section line VII—VII of Fig. 1 looking in the direction indicated by the arrows at the ends of the section line.

Figure 14:
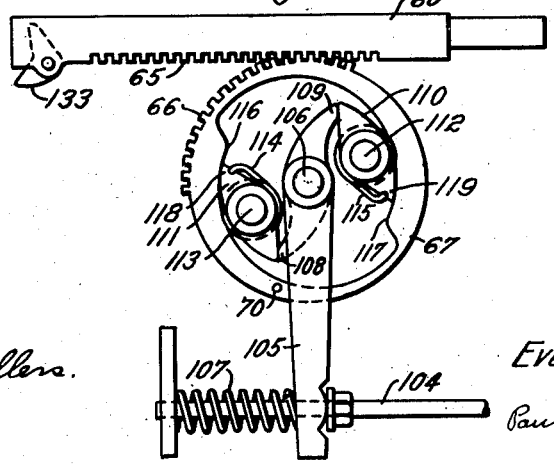
Figure 8:
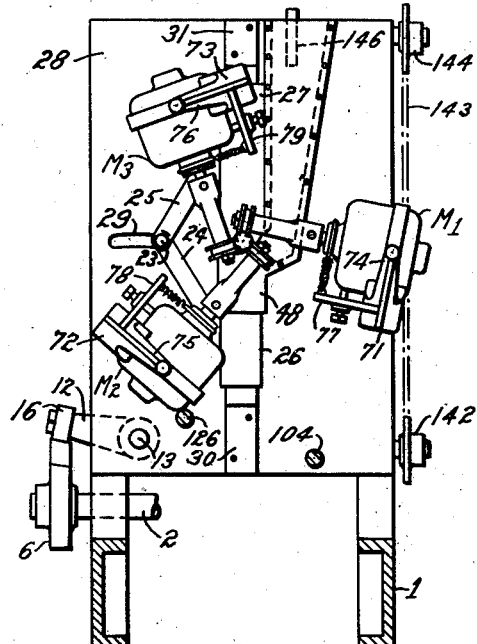
Figure 11:
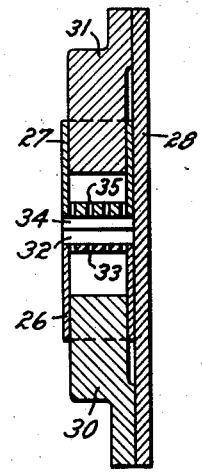
Figure 9:
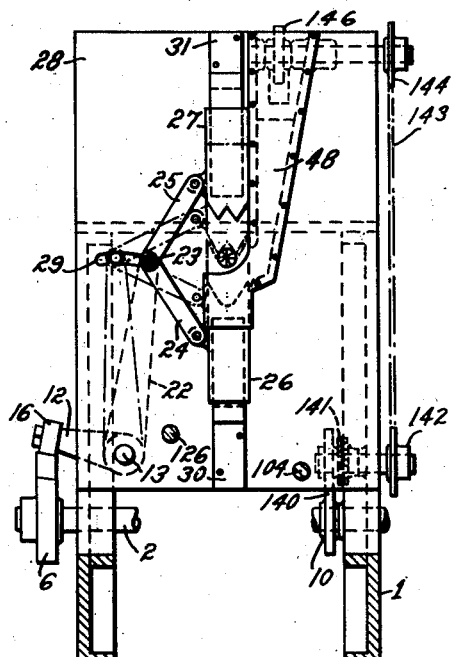
Figure 10:
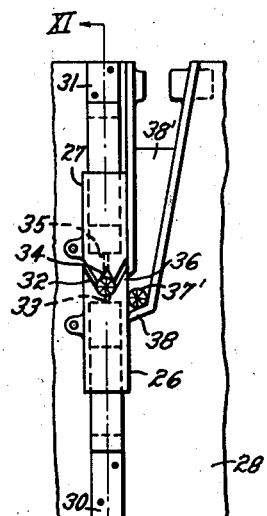
Figure 13:
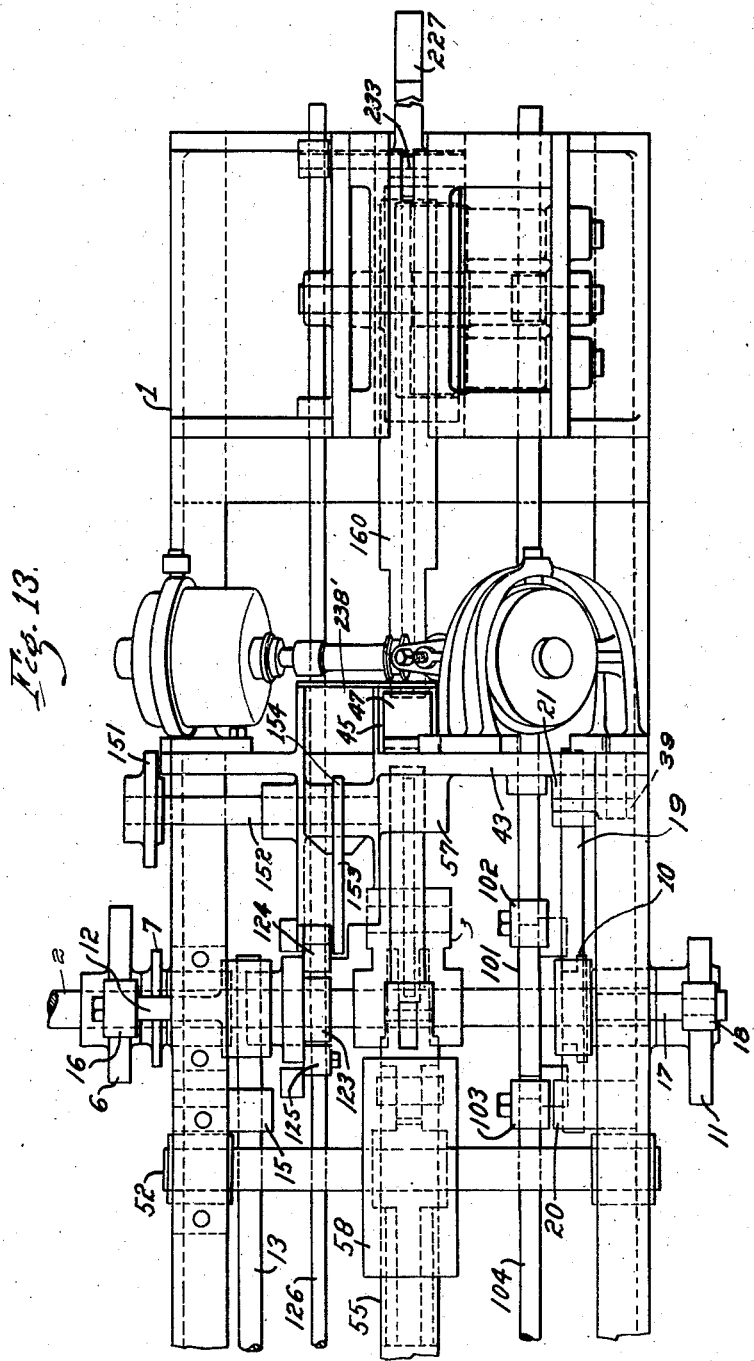

Fig. 8 is a sectional view on section line VIII—VIII of Fig. 1, but with the cutting motors in place, looking in the direction indicated by the arrows at the ends of the section line, Fig. 9 is a sectional view on section line IX—IX of Fig. 1 looking in the direction indicated by the arrows at the ends of the section line, Fig. 10 is a view of certain details shown in Fig. 9, Fig. 11 is a sectional view of a detail on section line XI—XI of Fig. 10, Fig. 12 is a side view, on a larger scale than Fig. 1, of the right end of my machine, Fig. 13 is a plan view of the subject matter shown in Fig. 12, and Fig. 14 is a side view of a detail.

In the drawings, 1 designates the frame, or base, upon which all the mechanisms for cutting the shells of nuts are mounted. This base is of suitable design to carry a motor (not shown) for driving the main shaft 2 operating all the moving parts of my nut sheller except the motors for operating the cutting saws.

The shaft 2 is in the nature of a crankshaft having the crank 3 disposed generally in the midregion of the machine. The shaft is mounted in suitable bearings 4 and 5 in the side portion of the frame. In addition to the crank 3, the shaft carries, rigidly attached to the shaft, a cam 6, a sprocket wheel 7, a cam 8, a cam 9, a sprocket wheel 10, and a cam 11. Cams 6 and 11 are identical in shape but are disposed 180° out of phase on the shaft 2. The shape of these cams will be apparent from the showing in Fig. 1.

Cam 6 operates the crank arm, or lever, 12 keyed, or otherwise rigidly secured to the longitudinally disposed shaft 13 rotatably mounted in bearings 14 and 15. The projecting end of the crank arm is provided with a roller 16 to facilitate the operation of the crank arm 12. The cam 11 operates the crank arm 17 carrying a roller 18 at its projecting end for contacting the cam 11. The crank arm 17 is rigidly attached to the shaft 19 disposed longitudinally of the machine frame 1. The shaft 19 is mounted for rotary movement in bearings 20 and 21.

From the shape of the cams 6 and 11, it will be apparent that for about one half of one revolution of cam 6, arm 12 will remain in its lowermost position. Then as the cam 6 rotates through approximately thirty additional degrees, the crank arm moves to the position shown in Fig. 7 thereby rotating the shaft 13 through a given angle. For the succeeding approximately one-hundred and twenty degrees the crank arm 12 remains in the position shown in Fig 7 and then during an additional rotation of approximately thirty degrees moves back to its lowermost position. Since cam 11 is 180° out of phase on shaft 2, the shaft 19 is rotated similar to shaft 13 but directly 180 degrees out of phase.

Shaft 13, near the bearing 14 is provided with a projecting arm 22. This arm projects in a generally vertical direction and is rigidly secured to shaft 13. Lever 12, shaft 13 and arm 22 thus are in effect a bell-crank lever. In the upper end of arm 22 a stub shaft 23 projects toward the left, that is, in a longitudinal direction of the machine frame. A pair of links 24 and 25 are at corresponding ends pivotally secured to the stub shaft 23. Link 24 has its other end pivotally secured to the lower nut centering head 26 and the other end of link 25 is pivotally secured to the upper nut centering head 27. The web 28 is provided with a suitable slot 29 to permit the oscillatory motion of the stub shaft 23. The oscillatory motion of stub shaft 23 will thus, through the links 24 and 25, operate the nut centering heads on the guide pistons 30 and 31.

The nut centering heads are generally rectangular in section—preferably square in section—thus forming rectangular sleeves that fit fairly snugly over the rectangularly shaped pistons 30 and 31. The bottom of nut centering head 26 is open at the bottom, fitting over piston 30. The nut centering head 27 is open at the top and fits over piston 31. These pistons thus form guides for the nut centering heads permitting only reciprocatory motion.

The top end of nut centering head 26 is V-shaped and is provided with a V-shaped closure 32 having a plurality of holes 33 at the apex of the closure 32. Since the piston 30 fits snugly into the nut centering head 26, air will be alternately blown from and drawn into the chamber formed between piston 30 and the nut centering head.

The bottom end of the nut centering head 27 is provided with a W-shaped closure 34 with the outer legs of the W conforming to the V of the nut centering head 26. The closure 34 is provided with a plurality of holes 35 for producing an air transfer effect from and to the chamber formed by piston 31 and nut centering head 27, similar to that effected by holes 33. The utility of these functions will become apparent presently.

As the nut centering heads 26 and 27 move from the full-line position shown in Figs. 10 and 11 and the dotted line position shown in Fig. 9 to the full-line position shown in Fig. 9, the edge 36 moves down sufficiently (see Figs. 9 and 10) to permit the nut 37 to roll into the trough of the nut centering head 26. Since the nut centering head is still moving downwardly, the air being expelled through holes 33 twirls the nut 37. (My machine is primarily designed for pecans but is useful for shelling any type nut having generally the shape of pecans.) No matter how the nut tumbles into the trough the nut centering head 26, the twirling of the nut will invariably position the nut so that its longitudinal axis is disposed longitudinally of the trough.

The normal tendency of a pecan is to take the correct position while in the V-shaped lower end of chute 38. But a machine to be of real utility must be able to handle ungraded pecans. Ungraded pecans have various sizes and vary considerably both in size and shape. My machine operates substantially equally as well on ungraded nuts as on graded nuts. The shape of the nut centering head and the twirling action produced on the nut by the air flow from the holes invariably positions the nut so that it has its apexes disposed in parallel alignment with bottom edge of the V-shaped trough formed by the closure 32. The utility of such positioning of the nut in nut centering head 26 will become more apparent hereinafter.

The holes 33 have still two other functions. Shell chips, nut fiber dust and other foreign particles are always found about a nut shelling machine. Such foreign matter may get into the troughs of the nut centering heads. The air being expelled through holes 33 and 35 blows such particles away during retraction, or recession of the nut centering heads from each other. When the nut centering heads approach each other the air flow is reversed. The suction produced at holes 33 now acts to hold the nut in its aligned position.

The shaft 19 is provided with upwardly projecting arm 39. This arm 39, shaft 19 and crank arm 17 also form a bell-crank lever. Arm 39 carries a stub shaft 40 upon which the corresponding ends of links 41 and 42 are pivotally mounted. The web 43 is provided with suitable slots to permit oscillatory movements of the stub shaft 40.

The other end of link 41 is pivotally secured to the nut centering head 44 and the other end of link 42 is pivotally secured to nut centering head 45. These nut centering heads fit over pistons 46 and 47 and these centering heads and associated elements are in construction and function in every respect like the centering heads 26 and 27 and their associated elements. It should be remembered though that all functions are 180° out of phase.

The crank 3 (see Figs. 1, 2, 7 and 13) is connected to a link 50. This link 50 has pivotal engagement with the lower, or actuating end, of the gear sector 51. This gear sector is rotatably mounted on the jack shaft 52. As the shaft 2 rotates the gear sector, through the action of the link 50 attached to the lower actuating end of the gear sector, it actuates the gear sector in an angularly oscillatory manner through a given angle.

The gears 53 of the gear sector are disposed to mesh with the rack teeth 54 of the nut driving plunger 55. This nut driving plunger operates in suitable bearings 56 and 57 in the webs 28 and 43, and also rides in the V-shaped guide way 58 rigidly secured to the machine frame. The nut driving plunger is thus held in position to keep its rack teeth 54 in mesh with the gear teeth 53. From the construction just explained, it is apparent that the nut driving plunger 55 oscillates back and forth in its bearings as the shaft 2 rotates.

The length of the nut driving plunger 55 is such that when it is in its extreme left-hand position as shown in Figs. 1 and 2, its right end is a short distance to the left of the left face of the nut centering heads 44 and 45 and its left end is just to the left of the vertical plane occupied by the nut cutting saws at the left and described hereinafter. When the nut driving plunger is in its extreme right-hand position, its left end is just to the right of the right face of the nut centering heads 26 and 27, whereas its right end is to the right of the vertical plane occupied by the nut cutting saws at the right. When the nut driving plunger is in its extreme right-hand position, its left end, and thus the entire plunger, is in substantial alignment with the apexes of the nut at that time being held by the nut centering heads 26 and 27. The right end of the nut driving plunger is similarly in alignment with the apexes of the nut being held by nut centering heads 44 and 45 when the plunger is in its extreme left-hand position.

To hold the nut, say nut 37 once it is held in its centered position by the nut centering heads 26 and 27, I provide a nut driven plunger 60 in suitable adjustable guide ways 61 and 62. These guide ways may be suitably adjusted so that the nut driven plunger is in accurate alignment with the nut driving plunger 55. Once the accurate adjustment has been made, the guide ways are locked in position by the screws 63 and 64.

The nut driven plunger 60 is provided with rack teeth 65 at its lower surface. These rack teeth mesh with teeth 66 on one end of the periphery of the drum 67. The other end of the periphery of drum 67 is in the shape of a sheave, or pulley. A cable 68 is attached to the drum at a suitable place and is passed over the sheave so that the drum, as seen in Fig. 1, is biased for clockwise rotation by the weight 69 attached to the lower end of the cable 68. The clockwise bias of the drum 67 thus, in the absence of any other longitudinal forces acting on plunger 60, biases this plunger 60 to its extreme right-hand position.

The drum is provided with suitable stop pins 70, or other stop means. The length of plunger 60 is so chosen that when it is in its extreme right-hand position, its right end is at the left of the nut centering heads 26 and 27, that is, as seen in Fig. 1. When in this position it is apparent that the longitudinal distance between the left end of the nut driving plunger 55 and the right end of the nut driven plunger 60 is a trifle greater than the largest pecan ordinarily encountered in ungraded pecans.

If graded nuts are being shelled, the longitudinal disposition of the nut driven plunger 60 may be adjusted by suitable adjustment of the guide ways 61 and 62. By longitudinal adjustment of these guide ways—which may, of course, also be done—the stop position of plunger 60 may be altered. If the guide ways 61 and 62 are adjusted toward the left, the stop pin 70 on drum 67 engages the guide ways 61 and 62 sooner and the spacing between the plunger ends is increased. The reverse is true if the guide ways 61 and 62 are adjusted toward the right.

The plunger ends are generally cup-shaped as is apparent from Fig. 6 as well as Fig. 1. These cup-shaped ends receive the apexes of the nut and the edges firmly grip the nut. To effect the proper cutting of the shell of the nut, I dispose three pivotally mounted motors on each of the webs 28 and 43.

Web 28 carries brackets 71, 72 and 73. These brackets each carry hoops, or arcuate arms 74, 75 and 76, respectively, each having a pair of trunnions whose axes are disposed longitudinally of the machine. The motor frames are so pivoted on these trunnions that the rotor axes are at right angles to the trunnions. The motor axes are thus disposed in a plane parallel to web 28.

The projecting motor armature shafts each carry a pair of spaced nut shell cutting saws. The disposition of the motor armature axes is such that the cutting saws are disposed in planes parallel to the longitudinal axes of the nut driving and nut driven plungers.

The brackets 71, 72 and 73 are also provided with arms 77, 78 and 79. A tension spring, as shown, is connected to each of the respective motor frames and the respective arms to bias motor armature axes for counterclockwise rotation to thus bring the cutters or saws in position with reference to the plunger ends. Counterclockwise rotation is adjustably limited by the set screws shown in arms 77, 78 and 79.

The cup-shaped ends of the plungers are provided with six slits. These slits, 81 to 86, inclusive, for one plunger, are shown in Fig. 6. The saws 91, 92, 93, 94, 95 and 96 project through these slits. The disposition and dimensioning is such that the spacers 87, 88 and 89 ride on the end portion of the plunger and such that during the nutshell cutting operation the spacers ride on the nut. The distance between the outer periphery of the saws and the outer periphery of the spacers is such that the saws will cut entirely through the nut shell but yet not cut the kernel.

During a nutshell cutting operation the nut centering heads, say 26 and 27, first center the nut—the pecan—so that its apexes are substantially in line with the nut driving and nut driven plungers. The nut driving plunger 55 then moves toward the left engaging the right nut apex. The left nut apex is driven into the right end of the nut driven plunger 60. Meanwhile the saws are driven at high speed by the motors $M_1$, $M_2$ and $M_3$.

At this stage the saws are still in the slits of the right end of plunger 60. The nut now becomes the operating element to drive, or operate, the nut driven plunger 60 to the left. The saws immediately begin to cut the nut to the right of its left apex. The nutshell is thus cut, the saws making six longitudinal slits in the nutshell with a pair of cuts being made in regions spaced at about the longitudinal axis of the nut. The spacers between the saws ride on the nutshell thus preventing the saws from making a deeper cut than desired. When substantially the entire length of the nut has been traversed by the saws, the saws move into slits in the walls of the cup-shaped left end of the nut driving plunger. Just before the nut driving plunger moves to its extreme left-hand position, the nut driven plunger is arrested in its retracting motion toward the left. Since the plunger 55 continues to move to the left, the nut is subjected to a longitudinal force thereby cracking the strips of nutshell into many pieces. The nutshell pieces and kernel drop from the gripping engagement of the plungers 55 and 60 into a suitable hopper or conveyor to the shell and kernel segregating devices which form no part of my invention.

The arresting function of plunger 60 in the proper position is an important feature of my invention. Since units of various lengths are being cut, the plunger 60 cannot be arrested at a fixed position with reference to the machine frame but must be arrested in its retracting motion as a function of the length of the nut.

How the plunger 60 is accurately arrested in the proper position will be apparent presently.

The shaft 2, as already pointed out, drives cam 9. This cam 9 coacts with rollers 97 and 98 mounted at diametrically opposite points on the pan-shaped member 99 pivoted on jack shaft 100. The member 99 has an opening between the rollers 97 and 98 large enough to at no time contact shaft 2 during its oscillatory angular movement about shaft 100. The upper end of member 99 is provided with a projecting pad, or wide dog 101 disposed in direct contact on opposite sides with the lugs 102 and 103 fixed on rod 104.

The left-hand end of rod 104 is as shown operatively coupled to the lower end of lever 105 pivoted near its upper end on the shaft 106 on which the drum 67 is rotatably mounted. The rotation of shaft 2 thus, through the actuation of cam 9, rollers 97 and 98, member 99, pad 101 and lugs 102 and 103, causes rod 104 to be moved rather rapidly toward the right. This position is shown in Figs. 1 and 5. In so doing the lever 105 is moved counterclockwise on shaft 106. Spring 107 positively and rapidly effects such movement. Further, the position of cam 9 on shaft 2 is such that this counterclockwise movement of lever 105 occurs near the end of the leftward movement of plunger 55 but at a time when still some relatively small desired distance of leftward movement of plunger 55 is effected after lever 105 has been thus actuated. Further, the disposition of cam 9 is such that the stated movement of lever 105 occurs just after the cutting operation on the nut disposed between the left end of plunger 55 and the right end of plunger 60 has been completed.

The end of lever 105 at its pivot region on shaft 106 is provided with a pair of diametrically disposed dogs 108 and 109. The drum 67 is generally cup-shaped and the arrangement is such that these dogs are disposed within the cup of the drum.

A pair of pawls 110 and 111 are pivoted on stub-shafts 112 and 113 disposed parallel to shaft 106. (Note Figs. 2 and 14.) Both pawls are biased for counterclockwise rotation about their shafts by relatively stiff and suitably stressed helical springs 114 and 115. Corresponding ends of these springs are secured to the drum or shaft as desired and have their other corresponding ends engage the pawls for counterclockwise rotation as shown in Fig. 14.

The inside surfaces, namely, the inside wall portion of the cup-shaped drum are provided with the eccentric cam surfaces 116 and 117. These surfaces may be knurled or otherwise suitably prepared to have an extremely high coefficient of friction. The pawls are also so designed as to have a high coefficient of friction at the regions 118 and 119.

When a nut cutting operation has just been completed the plunger 60 will still be moving toward the left and in consequence drum 67 will be rotating counterclockwise. However, when lever 105 moves counterclockwise, as hereinbefore pointed out, the dogs 108 and 109 move counterclockwise, thus permitting the springs 114 and 115 to operate the pawls counterclockwise. The regions 118 and 119 engage the eccentric cam surfaces to thus instantly and accurately arrest the rotation of drum 67 at a time when plunger 55 is still moving toward the left. Since the drum 67 arrests the leftward movement of plunger 60, the nut gripped between these plungers is effectively cracked.

It is important to point out that drum 67, and thus the nut driven plunger 60, is not arrested at a time when the drum has moved through a given angular position, or when plunger 60 has moved a given distance with reference to a point on the machine frame, but is arrested accurately and positively when the left-hand end of plunger 55 is in a given position with reference to a given point on the machine frame. The nut cracking operation is thus invariably effected in substantially the same manner independent of the length of the nut.

Prior art devices have attempted to accomplish this very desirable function by the use of pawl and ratchet means. Such means cannot accomplish the desired function because the probabilities are not in favor of such operation but favor only a "now and then" correct operation.

My special cams 116 and 117 are so shaped and so curved and so disposed with reference to the centers of rotation of the pawls and the shapes of the pawls, all substantially as shown, that when springs 114 and 115 actuate the pawls and there is counterclockwise rotation of drum 67 a buckling action takes place at regions 118 and 119. As soon as the nut cracking operation has been completed, the nut no longer produces a counterclockwise torque on drum 67, since the nutshells and kernel drops free of the plunger ends. The weight 69 now places a clockwise torque on drum 67. At this stage a frictional braking action takes place at regions 118 and 119 to prevent plunger 60 from moving toward the right. The need for this essential function will become clear hereinafter.

At the instant plunger 60 is arrested and plunger 55 still moves toward the left, the nut is cracked. However, it is important that the plunger pressure be not at the apexes of the nut. Pressure on the apexes produces forces on the cut nutshell effecting very irregular cracking. It is important, to obtain the cleanest kernels and to facilitate sorting of the shells and kernels, that the nutshell be cracked at the two circumferential regions constituting the termini of the six slits cut in the nutshell. This I accomplish by the use of the cup-shaped ends, as against cone-shaped ends of the prior art, provided at the nut engaging ends of plungers 55 and 60. See Figs. 1 and 6.

The shaft 2 also rotates cam 8. This cam is generally of the same shape as cam 9. The difference will be readily apparent from a comparison of Figs. 4 and 5. This cam 8 actuates a pan-shaped member 120 by the action on rollers 121 and 122. The upper end of member 120 is provided with the pad, or dog, 123 (somewhat longer than pad 101) for operating the lugs 124 and 125 fixed on rod 126.

Rod 126 has operative engagement with the lower end of lever 127 pivoted on the machine frame at 128.

The nut driven plunger 60 is hollow, as shown in Fig. 1. A nut apex expelling rod 129 is disposed in the plunger 60. This rod 129 has a piston-like end 130 fitting into the enlarged left-hand axial opening or chamber 131 in the plunger 60. A compression spring 132 is disposed in the chamber 131. This spring is disposed under just sufficient compression to normally hold the rod 129 in the position shown.

A bell-crank lever 133 is pivotally mounted on the left-hand end of plunger 60. This lever has an upwardly directed end in operative relation to piston 130 and a lower end so disposed that upward, or clockwise movement of the lower end actuates the rod 129 toward the right so that the apex of the nut that may lodge in the nut engaging end of plunger 60 is ejected from the end. The clockwise movement of the bell-crank lever 133 is effected by the cam surface 134 of the upper end of lever 127.

The timing is so arranged that a very short time after the hereinbefore mentioned buckling action takes place at region 118, the rod 126 moves to the left causing clockwise rotation of lever 127. The cam surface 134 actuates the bell-crank lever 133 which, in turn, drives the rod 129 toward the right with reference to the plunger 60, thus ejecting the nut apex that may be in the nut engaging end of plunger 60. The cam surface 134 is made long enough that the length of the nut will not alter the operation desired.

Since the right-hand nut apex may also lodge in the nut engaging end of plunger 55, some provision has to be made to also eject the lodged apex from plunger 55.

The plunger 55 is provided with an axial opening, or channel, within which rod 135 is slidably disposed. This rod is suitably spring biased toward the right with reference to the plunger 55 to normally hold the position indicated in Fig. 1. Near the region to the left of the rack teeth, the plunger 55 is provided with a downwardly open slot within which the bell-crank lever 136 is mounted. The lower arm of the bell-crank lever 136 is provided with a cam surface disposed to be actuated by the upper short end of the pendulous member 137 disposed for pivotal movement on the projecting bar 138. This pendulous member 137 is disposed for ready counterclockwise rotation but clockwise rotation cannot take place from the position shown because of the stop pin 139 on the bar 138. During movement of plunger 55 toward the left, as the lower end of bell-crank lever passes the pendulous member, the pendulous member readily rotates counterclockwise. The bell-crank lever 136 is thus not actuated, but during the movement of plunger 55 toward the right, pendulous member 136 acts like a fixed stop. The lower end of the bell-crank lever is thus actuated upwardly, that is, is rotated counterclockwise. This counterclockwise rotation of the bell-crank lever 136 moves the rod 135 toward the left with reference to the plunger 55 with the result any nut apex that may be lodged in the nut engaging left end of plunger 55 is ejected.

The shaft 2 actuates sprocket 10. This sprocket through chain 140 and transmission gears 141 drives the sprocket 142. This sprocket 142 through chain 143 and sprocket 144 drives the shaft 145. The upper sprocket 146 for the nut elevating conveyor 147 is keyed to this shaft 145. The lower or idler sprocket 148 is disposed into the supply hopper 149.

The nut conveyor carries nut elevating cups like those shown as 156 in Fig. 12 for conveyor 153. The speed and disposition of the nut carrying cups is such that one nut is always positioned into the chute 38' while the nut centering heads 26 and 27 are in the position shown in Fig. 10. Nut 37' may be the nut in question.

The nut, of course, tumbles down the chute 38' in almost any manner. However, in view of the V-shaped lower end 38 of the chute 38', the nut is more than likely to take a position so that it is disposed longitudinally of the trough-like bottom 38. There is, however, no certainty about such disposition of the nut.

It will be noted that centering head 26 forms the closure for the left-hand side of the bottom 38 of the chute 38'. After the plungers 55 and 60 have taken the nut ahead of nut 37 away from the centering heads 26 and 27 and a second nut, say nut 37', is to be centered, the centering heads 26 and 27 recede from each other. In so doing the centering head 26 moves downwardly. Since its right-hand side as seen in Fig. 10 contacts the nut in the bottom of the chute, the nut is twirled or rotated about an axis in parallel alignment with the bottom line of the V-shaped trough formed by the closure 32 for nut centering head 26. In short, the nut is rotated counterclockwise.

Since the shape of the region at the bottom 38 is such that the nut cannot rotate end over end, and since the probability of a nut being in the exact position that end over end rotation is expected of it by the rotation forces produced by the recession of nut centering head 26 is most extremely remote, the nut rotates and slides into such position that its longitudinal axis becomes properly aligned.

The angle of the V for the nut centering head 26 is so chosen from experience that when the right-hand upper end of the nut centering head is low enough to permit the nut to roll into the centering head 26, the nut positions itself into the centering head without in any material degree changing the already established direction of its longitudinal axis.

The shaft 2 also rotates sprocket 7. This sprocket drives chain 150 which drives the sprocket 151 keyed to shaft 152 for driving the nut elevating conveyor 153. This conveyor 153 is trained over sprockets 154 and 155 disposed as shown in Figs. 1, 2 and 12. The conveyor carries nut carrying cups 156.

The disposition of the cups 156 and the speed of the conveyor are so chosen that one nut is disposed into the chute 238' when the nut centering heads 44 and 45 are in the position shown for nut centering heads 26 and 27 in Fig. 10.

The chute 238' is exactly like chute 38' and all the other parts, as nut driven plunger 160, drum 167, cable 168, weight 169, lever 205, lever 227, bell-crank lever 233, etc., are substantially like in structure and function to the corresponding elements at the left of the machine. There is, however, distinct coaction between the parts.

For example, when plunger 55 is in its extreme left-hand position, the right nut engaging end is disposed as shown in Fig. 12. During this time the nut centering heads 44 and 45 perform their nut centering operation. At the same time—more accurately somewhat prior to the time specified—the buckling action at region 218 ceases because the rod 104 has actuated lever 205 toward the left. The pawls 210 and 211 have thus been moved to the position shown.

The drum 167 is thus free to rotate, the rotation being effected by the weight 169. The plunger 160 is thus moved to the position shown. There is thus no idle, or recovery, motion of any essential part of my machine. The output of my invention is thus, at a minimum, still double the output of prior art machines.

My experimental work on this novel machine has shown that certain features of the machine I disclose in my copending case Serial No. 462,701, filed October 20, 1942, entitled Nut-shelling machine, had to be changed. This case is thus in the nature of a continuation in part of the earlier filed case which became abandoned May 13, 1945. All of the novel and valuable features and the broad concepts presented in my earlier case I am retaining in this case.

I claim as my invention:

1. In a nut-shelling machine, in combination, a mounting frame, a first plunger having depressions at each end for receiving the end of an elongated nut at each end, a pair of retracting plungers aligned with the first plunger and designed to receive the other ends of the respective nuts that may be placed at the nut receiving ends thereof, radial cutters having their cutting edges spaced a lesser distance apart than the smaller diameter of a nut disposed adjacent and surrounding each nut receiving end of the retracting plungers, means for aligning a nut between one retracting plunger and one end of the first plunger, means for moving the first plunger a given distance through the space between the cutters toward one retracting plunger, whereby the nutshell is cut into strips, and the nut moves said one retracting plunger, means for substantially instantly arresting the movement of the said one retracting plunger when the first plunger is in a given position with reference to the mounting frame but is yet just short of the given distance of movement of the first plunger, whereby the strips of nutshell are broken into a plurality of pieces, means for aligning a nut between the other retracting plunger and the other end of the first plunger at the moment the first plunger has travelled its said given distance in the direction of the first retracting plunger, said means for moving the first plunger being operable to move it back the same given distance to its starting position whereby the second retracting plunger is similarly moved and a second nut is thus moved past the cutters adjacent the second plunger and the nutshell is cut into strips, means for substantially instantly arresting the movement of the said second retracting plunger when the first plunger is in a given position with reference to the mounting frame but is yet just a short given distance of return movement of the first plunger, whereby the strips of the shell of the second nut are broken into a plurality of pieces.

2. In a nut-shelling machine, in combination, a mounting frame, a first plunger having cup-shaped depressions at each end for receiving the end of an elongated nut at each end, a pair of retracting plungers aligned with the first plunger and designed with similar facing depressions to receive the other ends of the respective nuts that may be placed at the nut receiving ends thereof, radial cutters having their cutting edges spaced a lesser distance apart than the smaller diameter of a nut, disposed adjacent and surrounding each nut receiving end of the retracting plungers, means for aligning a nut between one retracting plunger and one end of the first plunger, means for moving the first plunger a given distance through the space between the cutters toward one retracting plunger, whereby the nutshell is cut into strips, and the nut moves said one retracting plunger, means for substantially instantly arresting the movement of the said one retracting plunger when the first plunger is in a given position with reference to the mounting frame but is yet just short of the given distance of movement of the first plunger, whereby the strips of nutshell, during completion of the given distance of movement, are broken into a plurality of pieces, and means for ejecting the conical ends of the nut from the first pair of facing ends of the plungers, means for aligning a nut between the other retracting plunger and the other end of the first plunger at the moment the first plunger has travelled its said given distance in the direction of the first retracting plunger, said means for moving the first plunger being operable to move it back the same given distance to its starting position whereby the second retracting plunger is similarly moved and a second nut is thus moved past the cutters adjacent the second plunger and the nutshell is cut into strips, means for substantially instantly arresting the movement of the said second retracting plunger when the first plunger is in a given position with reference to the mounting frame but is yet just short of the given distance of return movement of the first plunger, whereby the strips of the shell of the second nut are, during completion of the return movement of the first plunger to its starting position, broken into a plurality of pieces, means for temporarily holding the respective retracting plungers in a fixed position after the breaking of the strips of nutshell while the center plunger moves away, and means for ejecting the conical ends of the nut from the second pair of facing ends of the plungers.

3. In a nut-shelling machine, in combination, a mounting frame, a first plunger having cup-shaped depressions at each end for receiving the end of an elongated nut at each end, cutters at each end of the first plunger, a pair of retracting plungers aligned with the first plunger and designed with similar facing depressions to receive the other ends of the respective nuts that may be placed at the nut receiving end of the retracting plungers, said cutters having their cutting edges spaced a lesser distance apart than the smaller diameter of a nut, disposed adjacent and surrounding the retracting plungers, means for rotatably aligning a nut between one retracting plunger and one end of the first plunger, means for moving the first plunger a given distance through the space between the cutters toward one retracting plunger, whereby the nutshell is cut into strips, and the nut moves said one retracting plunger, means for substantially instantly arresting the movement of the said one retracting plunger when the first plunger holds a given position with reference to the mounting frame but while it is yet just short of the given distance of movement of the first plunger, whereby the strips of nutshell, during completion of said given distance of movement, are broken into a plurality of pieces, means for rotatably aligning a nut between the other retracting plunger and the other end of the first plunger at the moment the center plunger has travelled its said given distance in the direction of the first retracting plunger, said means for moving the first plunger being operable to move it back the same given distance to its starting position whereby the second retracting plunger is similarly moved and the nut is thus moved past the cutters adjacent the second retracting plunger and the nutshell is cut into strips, means for substantially instantly arresting the movement of the said second retracting plunger when the first plunger holds a given position with reference to the mounting frame but while it is yet just a short given distance of return movement of the center plunger, whereby the strips of the shell of the second nut are, during completion of the return movement, broken into a plurality of pieces, means for temporarily holding the respective retracting plungers in a fixed position after the breaking of the strips of nutshell while the first plunger moves away, means for ejecting the nutshell ends from the nut receiving ends of the plungers during the instant the respective retracting plungers are respectively temporarily held in their fixed positions.

4. In a nut-shelling machine, in combination, a mounting having a cup-shaped axially aligned depression at each end for receiving one apex of an elongated nut in one depression and one apex of an elongated nut in the other depression, a pair of retracting nut driven plungers aligned with the nut driving plunger, each retracting plunger at the ends adjacent the depressions in the nut driving plunger being provided with an axially aligned cup-shaped depression for receiving the other apexes of the respective nuts that may be placed between the nut receiving ends thereof, circumferentially spaced and radially placed nut shell cutters having their cutting edges spaced a lesser distance apart than the smaller diameter of a nut, disposed adjacent each nut receiving end of the retracting plungers, means for aligning a nut between one retracting plunger and the adjacent end of the nut driving plunger, means for moving the nut driving plunger a given distance through the space between the cutters toward one retracting plunger, whereby the cutters cut the nutshell into strips, and the nut, acting as a force transmitting medium, moves said one retracting plunger, the total movement of the retracting plunger being a function of the distance of movement of the nut driving plunger and the length of the nut, means for substantially instantly arresting the retracting movement of the retracting plunger at an instant when the nut driving plunger, in its movement toward the retracting plunger, hold a given position with reference to the mounting frame but while the nut driving plunger is still moving toward the retracting plunger, whereby the strips of nutshell are, during completion of the stroke, broken into a plurality of pieces, and means for ejecting the nut ends that may lodge in the first pair of facing plunger ends, means for aligning a nut between the other adjacent nut-receiving ends of the retracting plunger and nut driving plunger at the moment the nut driving plunger has travelled at full travel distance in the direction of the first retracting plunger, said means for moving the nut driving plunger being operable to move it back the same travel distance to its starting position whereby the second retracting plunger is similarly moved as a function of the given distance of travel and the length of the second nut, whereby the second nut is moved past the cutters adjacent the nut receiving end of the second retracting plunger and the nutshell is cut into strips, means for substantially instantly arresting the movement of the second retracting plunger at an instant when the nut driving plunger holds a given other position with reference to the mounting frame but while the nut driving plunger is still moving toward the second retracting plunger, whereby the strips of nutshell are, during completion of the return stroke, broken into a plurality of pieces, and means for ejecting the nut ends that may lodge in the second pair of facing plunger ends.

5. In a nut-shelling machine, in combination, a mounting frame, a first plunger having depressions at each end for receiving the end of an elongated nut at each end, a pair of retracting plungers aligned with the first plunger and designed to receive the other ends of the respective nuts that may be placed at the adjacent nut receiving ends thereof, radial cutters having their cutting edges spaced a lesser distance apart than the smaller diameter of a nut, disposed adjacent and surrounding each nut receiving end of the retracting plungers, means for aligning a nut between one retracting plunger and one end of the first plunger, means for moving the first plunger a given distance through the space between the cutters toward one retracting plunger, whereby the nutshell is cut into strips, and the nut moves said one retracting plunger, means for arresting the movement of the said one retracting plunger just short of the given distance of movement of the first plunger, whereby the strips of nutshell are broken into a plurality of pieces, and means for ejecting the conical ends of the nut from the first pair of facing ends of the plungers, means for aligning a nut between the other retracting plunger and the other end of the first plunger at the moment the first plunger has travelled its said given distance in the direction of the first retracting plunger, said means for moving the first plunger being operable to move it back the same given distance to its starting position whereby the second retracting plunger is similarly moved and the nut at the other adjacent ends is thus moved past the cutters adjacent the second plunger and the nutshell is cut into strips, means for arresting the movement of the said second retracting plunger just a short given distance of return movement of the first plunger, whereby the strips of the shell of the second nut are broken into a plurality of pieces, means for temporarily holding the respective retracting plungers in a fixed position after the breaking of the strips of nutshell while the first plunger moves away, and means for ejecting the conical ends of the nut from the second pair of facing ends of the plungers.

6. In a nut-shelling machine, in combination, a base, a first plunger disposed for longitudinal movement on the base, a second plunger aligned with the first plunger also disposed for longitudinal movement on the base, a stop on the base, means for biasing the second plunger against the stop, the stop being so disposed that the adjacent plunger ends are spaced a given distance from each other, means for axially aligning an elongated nut in the space between the adjacent ends of the plungers, said last named means comprising a chute having a slanting bottom, a pair of nut centering heads one disposed above the adjacent plunger ends and one disposed below adjacent plunger ends, the bottom nut centering head having a V-shaped trough-like closure for receiving a nut to be aligned, the sidewall of the bottom nut centering head forming a closure at one side of the chute when the nut centering heads are in position for centering a nut, means for operating the nut centering heads so that they recede from each other and both recede from the nut centering position, whereby the bottom nut centering head in its downward movement rotates the nut in the chute, whereby the nut axis is caused to move in parallel relation to the plunger axis and as the lower nut centering head moves low enough the nut so rolls into the V-shaped trough of the bottom nut centering head that the nut axis remains parallel to the common plunger axis, whereby the nut is accurately aligned with the nut centering heads again move to the nut centering position.

7. The subject matter of claim 6, wherein the nut centering heads are designed to move on piston type guides, openings in the nut engaging surfaces of the nut centering head, whereby the reciprocatory movement of the nut centering heads on the piston type guides act as an air pump for blowing dust and particles from the nut engaging surfaces of the nut centering heads.

8. The sub-combination of nut centering heads for a nut shelling machine, comprising a pair of nut centering heads, means for alternately moving the nut centering heads toward each other to a nut centering position and away from each other to receive a second nut, piston type guides for the heads which are designed in a sleeve-like construction to fit over the piston guides, the heads at the adjacent ends having closures for receiving and holding a nut in a given position, apertures in the closure to permit a rapid airflow to and from the region below the closures as the heads are moved to thus keep the nut engaging surfaces of the closures clean of loose dust and shell particles.

9. The subject matter of claim 8, in combination, a chute having a sloping bottom and so disposed that the sidewall of the lower head, when in the nut centering position, forms a closure at the side of the chute, whereby the downward movement of the lower head produces rotary motion on the nut to thus cause the nut to align itself in definite relation to the nut centering heads.

10. In a nut-shelling machine having a driven plunger actuated by a driving plunger through the medium of a nut interposed between the plungers, in combination, a rack on the driven plunger, a brake drum provided with gear teeth meshing with the rack, means for biasing the drum and thus the driven plunger to a given spaced aligned position with the driving plunger, means disposed in the brake drum for stopping the drum in any angular position, and means for actuating said stopping means.

11. In a nut-shelling machine having a driven plunger actuated by a driving plunger through the medium of a nut interposed between the plungers, in combination, a rack on the driven plunger, a brake drum provided with gear teeth meshing with the rack, means for biasing the drum and thus the driven plunger to a given spaced aligned position with the driving plunger, means disposed in the brake drum for stopping the drum in any angular position, means for actuating said stopping means, and means for slowing down the return rotation of the drum.

EVERETT P. LEONARD.

REFERENCES CITED

The following references are of record in the file of this patent:

UNITED STATES PATENTS

| Number | Name | Date |
|---|---|---|
| 442,657 | Woodside | Dec. 16, 1890 |
| 702,721 | Gerstmayr | June 17, 1902 |
| 772,127 | Brown | Oct. 11, 1904 |
| 779,474 | Gruner | Jan. 10, 1905 |
| 914,082 | Stevens | Mar. 2, 1909 |
| 1,149,194 | Grimm | Aug. 10, 1915 |
| 1,203,086 | Watson | Oct. 31, 1916 |
| 1,417,272 | Maness | May 23, 1922 |
| 1,510,968 | Wadell et al. | Oct. 7, 1924 |
| 2,022,356 | Marghitan | Nov. 26, 1935 |